United States Patent
Tholence et al.

(10) Patent No.: US 11,719,492 B2
(45) Date of Patent: Aug. 8, 2023

(54) HEAT EXCHANGER AND ELECTRIC ARRANGEMENT COMPRISING HEAT EXCHANGER

(71) Applicant: HITACHI ENERGY SWITZERLAND AG, Baden (CH)

(72) Inventors: Frederic Tholence, Mölndal (SE); Ulf Sand, Västerås (SE); Rebei Bel Fdhila, Västerås (SE)

(73) Assignee: HITACHI ENERGY SWITZERLAND AG, Baden (CH)

(*) Notice: Subject to any disclaimer, the term of this patent is extended or adjusted under 35 U.S.C. 154(b) by 0 days.

(21) Appl. No.: 17/920,446

(22) PCT Filed: Apr. 7, 2021

(86) PCT No.: PCT/EP2021/059009
§ 371 (c)(1),
(2) Date: Oct. 21, 2022

(87) PCT Pub. No.: WO2021/219332
PCT Pub. Date: Nov. 4, 2021

(65) Prior Publication Data
US 2023/0124112 A1  Apr. 20, 2023

(30) Foreign Application Priority Data
Apr. 30, 2020  (EP) ................... 20172411

(51) Int. Cl.
*F28D 15/04* (2006.01)
*F28D 15/02* (2006.01)

(52) U.S. Cl.
CPC ......... *F28D 15/04* (2013.01); *F28D 15/0233* (2013.01)

(58) Field of Classification Search
CPC ...... F28D 1/0206; F28D 1/06; F28D 15/0233; F28D 15/04; F28F 2210/02
See application file for complete search history.

(56) References Cited

U.S. PATENT DOCUMENTS

| | | | |
|---|---|---|---|
| 4,266,602 A | 12/1981 | White et al. | |
| 8,573,289 B1 * | 11/2013 | Roper | F28D 7/0066 165/173 |
| 10,107,555 B1 | 10/2018 | Miller | |
| 2014/0014493 A1 | 1/2014 | Ryan | |

(Continued)

FOREIGN PATENT DOCUMENTS

| | | |
|---|---|---|
| CN | 1416580 A | 5/2003 |
| CN | 108534571 A | 9/2018 |

(Continued)

OTHER PUBLICATIONS

International Search Report and Written Opinion of the International Searching Authority, PCT/EP2021/059009, dated Jun. 16, 2021, 13 pages.

(Continued)

*Primary Examiner* — Tho V Duong
(74) *Attorney, Agent, or Firm* — Sage Patent Group

(57) ABSTRACT

A heat exchanger comprising a primary side; a secondary side; at least one primary structure on the primary side defining at least one primary space on the primary side; and at least one secondary structure on the secondary side defining at least one secondary space on the secondary side; wherein one or more of the at least one primary structure and one or more of the at least one secondary structure delimit a coolant volume separated from the at least one primary space and separated from the at least one secondary space; wherein one or more of the at least one primary structure and/or one or more of the at least one secondary structure comprises a three dimensional lattice body.

20 Claims, 8 Drawing Sheets

(56) References Cited

U.S. PATENT DOCUMENTS

| | | | |
|---|---|---|---|
| 2014/0251585 A1* | 9/2014 | Kusuda | F28D 1/0226 |
| | | | 165/164 |
| 2018/0117872 A1 | 5/2018 | Abu Al-Rub et al. | |
| 2018/0187984 A1 | 7/2018 | Manzo | |
| 2018/0331016 A1* | 11/2018 | Kang | F28F 3/12 |
| 2018/0356161 A1 | 12/2018 | Rousseau et al. | |
| 2020/0018560 A1 | 1/2020 | Sabo et al. | |
| 2020/0033070 A1 | 1/2020 | Vlahinos et al. | |
| 2020/0166289 A1 | 5/2020 | Jeffers et al. | |
| 2021/0156619 A1* | 5/2021 | Agarwal | F28D 15/0266 |
| 2021/0156624 A1* | 5/2021 | de Bock | F28F 13/08 |
| 2021/0180885 A1* | 6/2021 | Wiedenhoefer | F28F 13/06 |
| 2021/0293483 A1* | 9/2021 | Gerstler | B33Y 10/00 |

FOREIGN PATENT DOCUMENTS

| | | |
|---|---|---|
| EP | 0504865 A1 | 9/1992 |
| EP | 2466086 A1 | 6/2012 |
| EP | 3415856 A1 | 12/2018 |
| JP | S63127146 U | 9/1988 |
| JP | H05067890 A | 3/1993 |
| JP | 2003524893 A | 8/2003 |
| KR | 20090035088 A | 4/2009 |
| KR | 20190118037 A | 10/2019 |
| WO | WO 0163629 A1 | 8/2001 |

OTHER PUBLICATIONS

Korean Office Action, Korean Application No. 10-2022-7037613, dated Feb. 17, 2023, 6 pages.

Chinese Office Action, Chinese Application No. 2021800377862, dated Apr. 16, 2023, 9 pages.

Japanese Office Action and English Translation, Japanese Patent Application No. 2022-566293, dated Apr. 5, 2023, 6 pages.

* cited by examiner

HEAT EXCHANGER AND ELECTRIC ARRANGEMENT COMPRISING HEAT EXCHANGER

CROSS REFERENCE TO RELATED APPLICATIONS

This application is a 35 U.S.C. § 371 national stage application of PCT International Application No. PCT/EP2021/059009 filed on Apr. 7, 2021, which in turn claims foreign priority to European Patent Application No. 20172411.9, filed on Apr. 30, 2020, the disclosures and content of which are incorporated by reference herein in their entirety.

TECHNICAL FIELD

The present disclosure generally relates to a heat exchanger. In particular, a heat exchanger comprising a structure having a three dimensional lattice body, and an electric arrangement comprising such heat exchanger, are provided.

BACKGROUND

Transformer oil used in power transformers is often cooled by cooling arrangements, such as radiators or coolers. These cooling arrangements often constitute a significant part of the footprint of the transformer.

US 2020033070 A1 describes a heat exchanger including an enclosure and a minimal surface structure within the enclosure. The enclosure includes a first inlet, a first outlet, a second inlet, and a second outlet. The minimal surface structure separates a first volume and a second volume within the enclosure. The first inlet and the first outlet are in fluid communication with the first volume, and the second inlet and a second outlet are in fluid communication with the second volume. The first and second volumes are separated from mixing with each other.

SUMMARY

One object of the present disclosure is to provide a heat exchanger having an improved performance.

A further object of the present disclosure is to provide a heat exchanger having a compact design.

A still further object of the present disclosure is to provide a heat exchanger having a low weight.

A still further object of the present disclosure is to provide a heat exchanger requiring low amounts of fluids.

A still further object of the present disclosure is to provide a heat exchanger solving several or all of the foregoing objects in combination.

A still further object of the present disclosure is to provide an electric arrangement comprising an electric component and a heat exchanger, which electric arrangement solves one, several or all of the foregoing objects.

A still further object of the present disclosure is to provide an electric arrangement comprising an electric component and a heat exchanger, which electric arrangement enables an improved cooling of the electric component.

According to one aspect, there is provided a heat exchanger comprising a primary side; a secondary side; at least one primary structure on the primary side defining at least one primary space on the primary side; and at least one secondary structure on the secondary side defining at least one secondary space on the secondary side; wherein one or more of the at least one primary structure and one or more of the at least one secondary structure delimit a coolant volume separated from the at least one primary space and separated from the at least one secondary space; wherein one or more of the at least one primary structure and/or one or more of the at least one secondary structure comprises a three dimensional lattice body; and wherein the heat exchanger further comprises a separation structure providing a fluid tight seal between the at least one primary space on the primary side and the at least one secondary space on the secondary side, and wherein the separation structure is configured to allow coolant of the coolant volume to flow between the primary side and the secondary side.

Using the three dimensional lattice body, one or more of the primary space, the secondary space and the coolant volume is formed as a continuous labyrinth network. The lattice body increases the surface areas exposed for heat transfer. Heat transfer efficiency is thus improved by means of the lattice body. The lattice body further provides a good mixing environment and a low increase of pressure drop.

The lattice body may comprise a periodic pattern in each of two or three orthogonal directions, for example at least three periods in each direction. The lattice body may comprise a plurality of cells. The cells may be arranged orthogonally in two or three dimensions.

The at least one primary space may be in fluid communication with a larger volume containing a first fluid e.g., oil, on the primary side. The at least one secondary space may be in fluid communication with a larger volume containing a second fluid, e.g., the atmosphere, on the secondary side.

The first fluid can flow in the primary space, the second fluid can flow in the secondary space, and a third fluid, e.g., coolant, can flow in the coolant volume. In this case, the first fluid, the second fluid and the third fluid may never be mixed. The first fluid may be oil, the second fluid may be air and the third fluid may be another coolant. A sum of a volume of the primary space and a volume of the secondary space may substantially correspond to, or correspond to, the coolant volume.

The coolant volume may extend from the first side to the second side. The heat exchanger may further comprise a separation structure. The separation structure may define the primary side and the secondary side. The separation structure provides a fluid tight seal between the at least one primary space on the primary side and the at least one secondary space on the secondary side. The separation structure is configured to allow coolant of the coolant volume to flow between the primary side and the secondary side. The separation structure may for example be a separation wall. The separation structure may be constituted by a part of one or more of the at least one primary structure and/or a part of one or more of the at least one secondary structure. In some embodiments, the separation structure may be a structure in addition to the at least one primary structure and the at least one secondary structure. Accordingly, the coolant may evaporate inside the coolant volume on e.g., the primary side and may flow to the secondary side where it cools and condenses whereafter it may return to the primary side to evaporate again, in a cyclic manner.

The heat exchanger may comprise two-phase coolant within the coolant volume. In this case, a region of the coolant volume adjacent the primary space may be an evaporator region and a region of the coolant volume adjacent the secondary space may be a condenser region.

One or more of the at least one primary structure and/or one or more of the at least one secondary structure may be a pipe. The pipe may be a heat pipe. In this case, the heat exchanger takes advantage both of a three dimensional lattice body and of a heat pipe to further improve heat exchange performance with a compact and simple design.

The lattice body may comprise a triply periodic substantially minimal surface, such as a triply periodic minimal surface, TPMS. The TPMS may comprise, for example, a Schwarz P surface.

One or more of the at least one primary structure delimiting the coolant volume and one or more of the at least one secondary structure delimiting the coolant volume may be integrally formed. In this case, the separation structure may be arranged inside the integrally formed primary structure/secondary structure.

The at least one primary structure may comprise two primary structures delimiting the coolant volume therebetween, and/or the at least one secondary structure may comprise two secondary structures delimiting the coolant volume therebetween. In this way, the surface heat exchange can almost be doubled.

An inner primary structure may define an inner primary space and an outer primary structure may define an outer primary space. The inner primary space may or may not be in fluid communication with the outer primary space. A first fluid, such as oil, may flow in the inner primary space and in the outer primary space, and a third fluid, such as coolant, may flow in the coolant volume, between the inner primary space and the outer primary space.

An inner secondary structure may define an inner secondary space and an outer secondary structure may define an outer secondary space. The inner secondary space may or may not be in fluid communication with the outer secondary space. A second fluid, such as air, may flow in the inner secondary space and in the outer secondary space, and a third fluid, such as coolant, may flow in the coolant volume, between the inner secondary space and the outer secondary space.

One or more of the at least one primary structure and/or one or more of the at least one secondary structure may be additively manufactured. One example of additive manufacture is 3D printing. Also, the separation structure may be additively manufactured.

The at least one primary structure delimiting the coolant volume, and the at least one secondary structure delimiting the coolant volume may comprise a capillary structure towards the coolant volume. Alternatively, or in addition, the coolant volume, the at least one primary structure delimiting the coolant volume, and the at least one secondary structure delimiting the coolant volume may be configured to function as a heat pipe. These variants enhance passive cooling of the heat exchanger.

One or more of the at least one primary structure and/or one or more of the at least one secondary structure may comprise a rough surface having an arithmetic mean surface roughness of at least 10 μm, such as 10 μm to 200 μm. This surface roughness improves the heat exchange.

One or more of the at least one primary structure and/or one or more of the at least one secondary structure may comprise a customized surface for promoting fluid flow. The customized surface may be additively manufactured and/or polished together with the primary structure and/or the secondary structure. Based on one or more customized surfaces, the performance of the heat exchanger can be tuned to improve. According to one variant, at least 10% of the customized surface has been polished.

The customized surface, or areas of it, may comprise a periodic texture. The periodic texture may be designed to promote turbulence and thereby further improve heat transfer. The periodic texture may also be designed to further decrease the pressure drop. Examples of periodic textures are dimples, fins and shark skins.

The one or more of the at least one primary structure and/or the one or more of the at least one secondary structure that comprises the lattice body may also comprise non-flat and flow-promoting ends. The ends may for example be cones or hemispheres. Each end may close a respective cell of the lattice body.

According to a further aspect, there is provide an electric arrangement comprising a heat generating electric component and a heat exchanger according to the present disclosure arranged to cool the electric component. By means of the three dimensional lattice body of the heat exchanger, cooling efficiency of the electric component is improved.

Since the heat exchanger has a compact design, the electric arrangement can also be made more compact. In some embodiments, the electric arrangement can be made more powerful with the same footprint.

Using the heat exchanger, the electric arrangement can be made lighter. This in turn may reduce transportation costs. The heat exchanger may also enable the electric arrangement to be manufactured more easily.

The electric arrangement may comprise a dielectric cooling fluid on the primary side, such as dielectric oil. Due to the high heat transfer efficiency of the heat exchanger, the amount of dielectric cooling fluid can be relatively low. The electric arrangement may be configured to circulate the cooling fluid only by means of natural convection, i.e., without any mechanical assistance for circulating the cooling fluid.

The electric arrangement may further comprise a fan arranged to establish a fluid flow for cooling the secondary structure. In case one or more of the at least one secondary structure comprises a three dimensional lattice body, the fan may be arranged to establish a fluid flow through the lattice body.

The electric arrangement may be a high voltage static electric induction system, such as a power transformer. As used herein, a high voltage may be at least 30 kV, such as at least 100 kV.

Due to the large size of high voltage static electric induction systems, also the heat exchanger has to be relatively large (although compact). The large size of the heat exchanger enables additional functionalities to be added for enhanced cooling performance. Although the heat exchanger is mainly described in connection with a power transformer, the heat exchanger is not limited to an electric arrangement.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
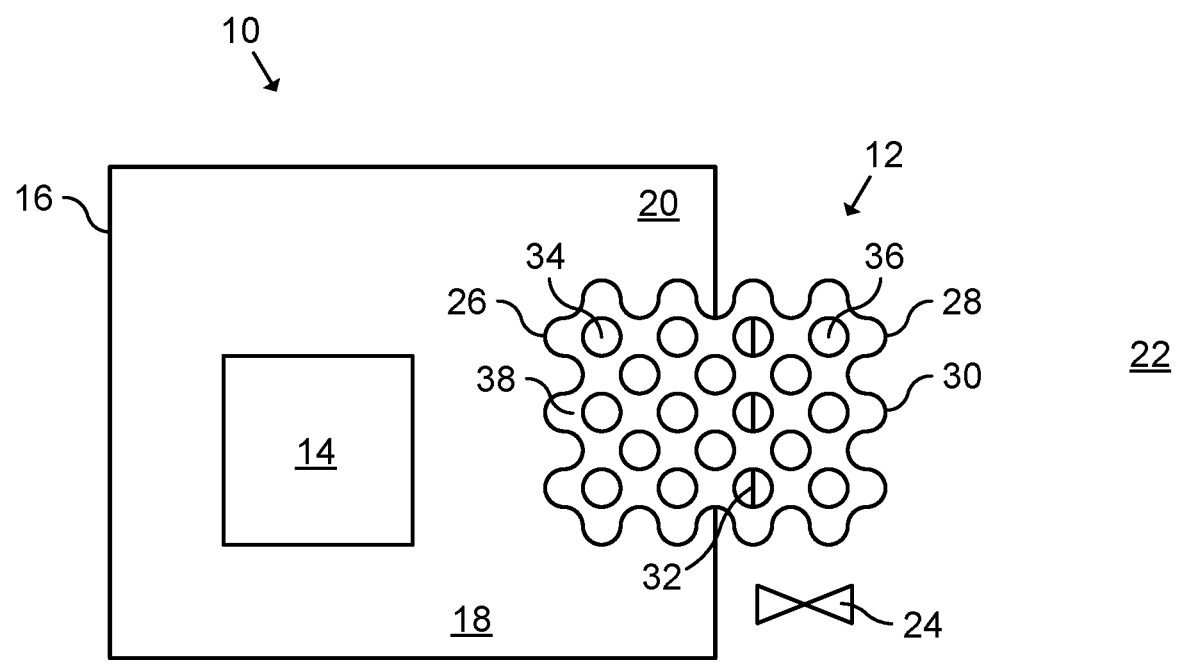
FIG. 1: schematically represents a side view of an electric arrangement comprising a heat exchanger.

In the following, a heat exchanger comprising a structure having a three dimensional lattice body, and an electric arrangement comprising such heat exchanger, will be described. The same or similar reference numerals will be used to denote the same or similar structural features.

FIG. 1 schematically represents a side view of an electric arrangement, here exemplified as a power transformer 10. The power transformer 10 comprises a heat exchanger 12. The power transformer 10 further comprises a heat generating electric component 14. The heat exchanger 12 is arranged to cool the electric component 14.

The power transformer 10 comprises a casing 16. The electric component 14 is arranged inside the casing 16. In this example, the casing 16 contains dielectric oil 18. The electric component 14 is submerged in the oil 18. The electric component 14 may be a winding of the power transformer 10.

FIG. 1 further shows a primary side 20 and a secondary side 22. The primary side 20 is provided inside the casing 16 and contains oil 18. The secondary side 22 is in this example the ambient atmosphere outside the casing 16. The heat exchanger 12 further comprises a fan 24.

Figure 2:
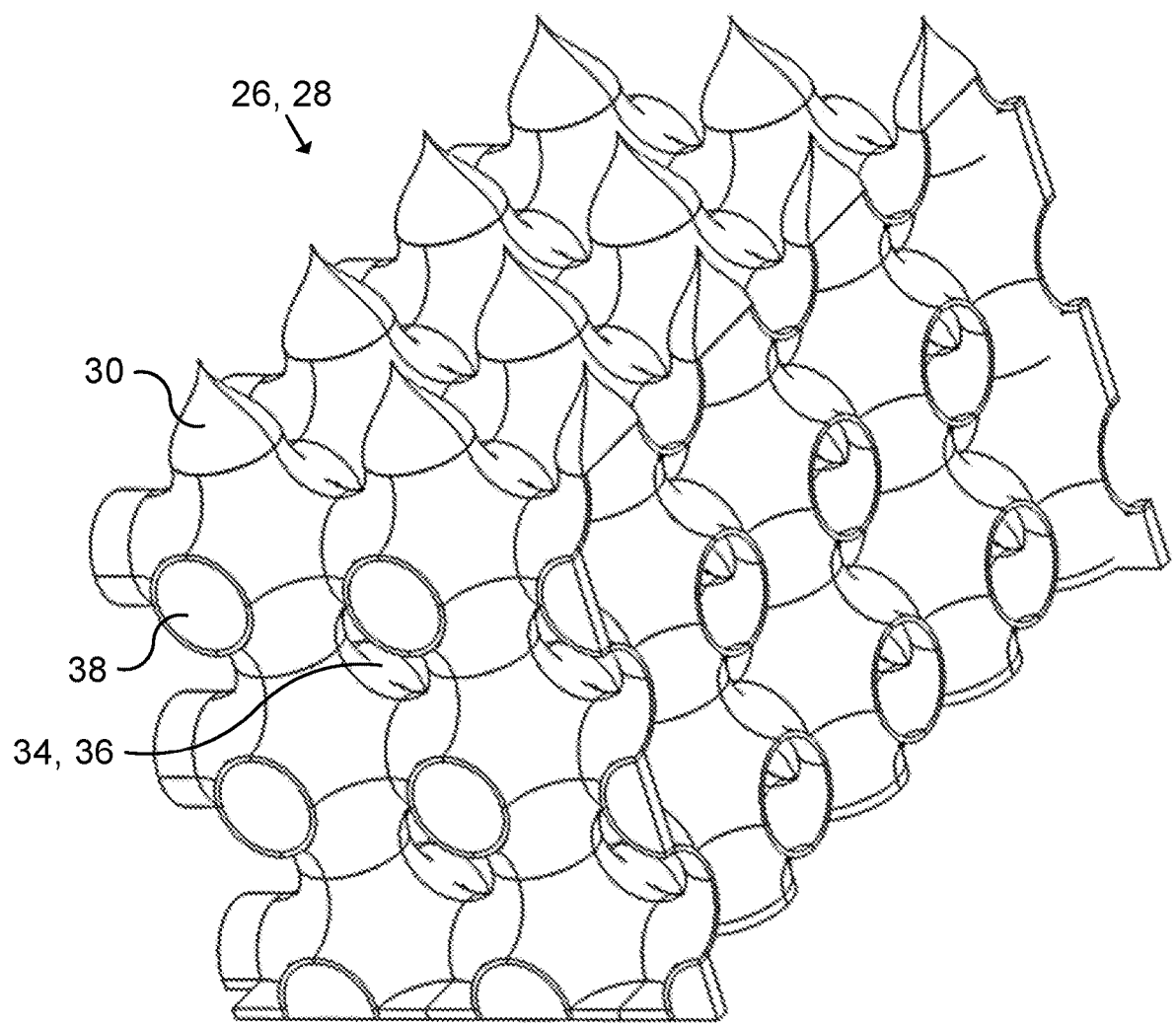
FIG. 2: schematically represents a partial perspective view of the heat exchanger in FIG. 1.

FIG. 2 schematically represents a partial perspective view of the heat exchanger 12 in FIG. 1. With collective reference to FIGS. 1 and 2, the heat exchanger 12 comprises a primary structure 26 and a secondary structure 28. The primary structure 26 and the secondary structure 28 are integrally formed in a three dimensional lattice body. The lattice body of this example comprises a triply periodic minimal surface, TPMS. The TPMS is here a Schwarz P surface. The TPMS comprises a plurality of cells. In this example, the cells are arranged in three orthogonal directions. Each of the primary structure 26 and the secondary structure 28 comprises flow-promoting non-flat ends 30, here exemplified as cones.

The heat exchanger 12 further comprises a separation structure, here exemplified as separation walls 32. Each separation wall 32 provides a fluid tight seal between the primary side 20 and the secondary side 22. The separation walls 32 can be arranged at various locations within the lattice body. The separation walls 32 do not necessarily need to be aligned with a wall of the casing 16. The primary structure 26, the secondary structure 28 and the separation walls 32 are additively manufactured, e.g. by means of 3D printing.

The primary structure 26 defines a primary space 34. The primary space 34 is in fluid communication with the primary side 20. In this example, the primary space 34 comprises a continuous labyrinth network outside the cells of the TPMS. The oil 18 may thus flow from the electric component 14 into the primary space 34 inside the primary structure 26 and back to the electric component 14. The primary space 34 may extend within the lattice body and outside the casing 16. How far the primary space 34 extends within the lattice body depends on the positioning of the separation walls 32.

The secondary structure 28 defines a secondary space 36. The secondary space 36 is in fluid communication with the secondary side 22. In this example, the secondary space 36 comprises a continuous labyrinth network outside the cells of the TPMS. The separation walls 32 are thus arranged outside the cells of the TPMS to seal between the primary space 34 and the secondary space 36. Ambient air may flow into and out from the secondary space 36 inside the secondary structure 28. The fan 24 may be used to force the air through the secondary space 36. The secondary space 36 may extend within the lattice body and into the casing 16. How far the secondary space 36 extends within the lattice body depends on the positioning of the separation walls 32.

The lattice cell body, here composed of the primary structure 26 and the secondary structure 28, delimits a coolant volume 38. In this example, the coolant volume 38 comprises a continuous labyrinth network inside the cells of the TPMS. The coolant volume 38 is separated from the primary space 34 and from the secondary space 36. The separation wall 32 is configured to allow coolant of the coolant volume 38 to flow between the primary side 20 and the secondary side 22.

The heat exchanger 12 further comprises two-phase coolant within the coolant volume 38. The coolant volume 38 thus forms an evaporator region and a condenser region adjacent the primary space 34 and the secondary space 36, respectively.

Figure 3:
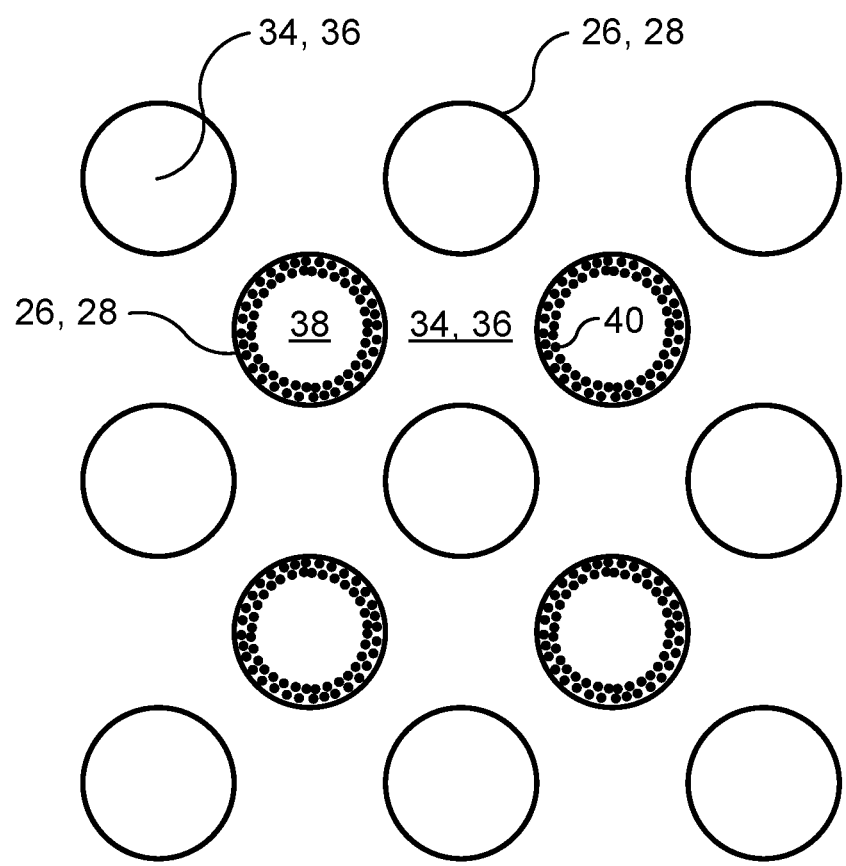
FIG. 3: schematically represents a partial cross-sectional side view of the heat exchanger in FIG. 1.

FIG. 3 schematically represents a partial cross-sectional side view of the heat exchanger 12 in FIG. 1. A surface of the lattice body facing towards the coolant volume 38 (inside the cells of the TPMS) is provided with a capillary structure 40. The primary structure 26, the secondary structure 28 and the coolant volume 38 are thereby arranged to function as a heat pipe.

Some parts of the surface of coolant volume 38 include a capillary structure 40 which is porous. The capillary structure 40 may be manufactured in various ways. The capillary structure 40 may for example be 3D-printed together with a wall of the primary structure 26/secondary structure 28 by adjusting a printing parameter to move from a fully dense to a porous structure.

In the evaporator region of the coolant volume 38 adjacent the primary space 34, the two-phase coolant absorbs heat from the oil 18 and evaporates. The vapour flows inside the coolant volume 38, but outside the capillary structure 40, to the lower temperature condenser region of the coolant volume 38 adjacent the secondary space 36, where the vapour condenses back to liquid and is absorbed by the capillary structure 40. The liquid then flows inside the capillary structure 40 from the condenser region back to the evaporator region.

The power transformer 10 of this example is passively cooled. During operation of the power transformer 10, the electric component 14 generates heat and heats the oil 18. The oil 18 entering into the primary space 34 is cooled by the coolant inside the coolant volume 38. Due to the lattice body, the surface area between the primary space 34 and the coolant volume 38 exposed for heat transfer is large. Correspondingly, the lattice body also provides a large surface area exposed for heat transfer between the coolant volume 38 and the secondary space 36, through which air is forced by means of the fan 24. The passive cooling is enhanced by the capillary structure 40. The heat exchanger 12 thereby provides a very effective heat transfer with a compact design. The oil 18 cooled by the heat exchanger 12 sinks due to natural convection and a circulation of the oil 18 is established inside the casing 16 (in a clockwise direction in FIG. 1).

Figure 4:
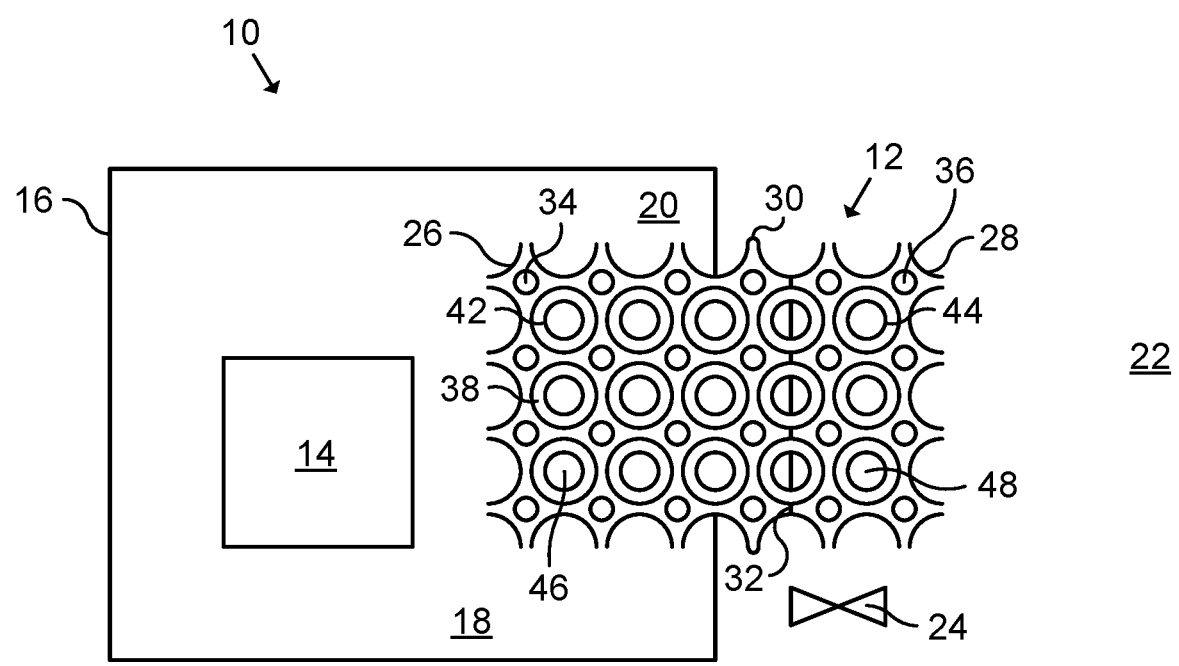
FIG. 4: schematically represents a side view of an electric arrangement comprising a further example of a heat exchanger.
Figure 5:
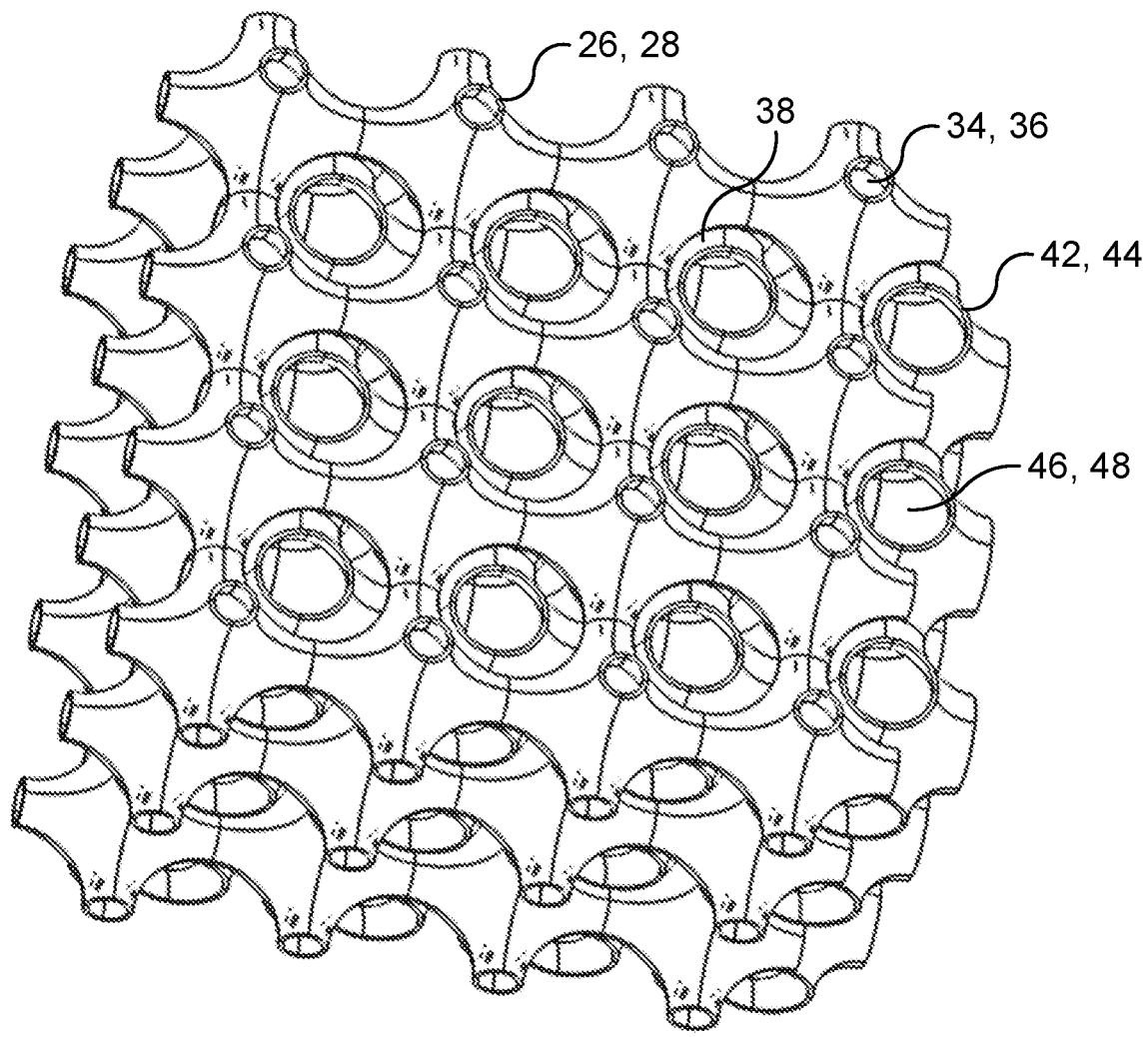
FIG. 5: schematically represents a partial perspective view of the heat exchanger in FIG. 4.

FIG. 4 schematically represents a side view of a power transformer 10 comprising a further example of a heat exchanger 12 and FIG. 5 schematically represents a partial perspective view of the heat exchanger 12 in FIG. 4. With collective reference to FIGS. 4 and 5, mainly differences with respect to FIGS. 1-3 will be described.

The heat exchanger 12 in FIGS. 4 and 5 comprises an inner primary structure 26, an outer primary structure 42, an inner secondary structure 28 and an outer secondary structure 44. The inner primary structure 26 is arranged inside the outer primary structure 42. The inner secondary structure 28 is arranged inside the outer secondary structure 44.

The inner primary structure 26 and the inner secondary structure 28 are integrally formed in an inner three dimensional lattice body. The outer primary structure 42 and the outer secondary structure 44 are integrally formed in an outer three dimensional lattice body. The lattice bodies are intricated. In this example, each of the inner lattice body and the outer lattice body comprises a triply periodic minimal surface, TPMS. Each lattice body comprises a plurality of cells. Each cell of the inner lattice body is arranged inside a cell of the outer lattice body. Also in this example, the cells of each lattice body are arranged in three orthogonal directions. In FIGS. 4 and 5, some of the separation walls 32 are arranged inside the cells of the inner lattice body and some of the separation walls 32 are arranged outside the cells of the outer lattice body.

The inner primary structure 26 defines an inner primary space 34 and the outer primary structure 42 defines an outer primary space 46. In this example, each of the inner primary space 34 and the outer primary space 46 is in fluid communication with the primary side 20. The inner primary space 34 comprises a continuous labyrinth network inside the cells of the inner lattice body. The outer primary space 46 comprises a continuous labyrinth network outside the cells of the outer lattice body. The oil 18 may thus flow from the electric component 14 into the inner primary space 34 of the inner primary structure 26 and into the outer primary space 46 of the outer primary structure 42, and then back to the electric component 14. The inner primary space 34 may extend within the inner lattice body (inside the cells thereof) and outside the casing 16. The outer primary space 46 may extend within the outer lattice body (outside the cells thereof) and outside the casing 16. How far the inner primary space 34 and the outer primary space 46 extend depends on the positioning of the separation walls 32.

The inner secondary structure 28 defines an inner secondary space 36 and the outer secondary structure 44 defines an outer secondary space 48. In this example, each of the inner secondary space 36 and the outer secondary space 48 is in fluid communication with the secondary side 22. The inner secondary space 36 comprises a continuous labyrinth network inside the cells of the inner lattice body. The outer secondary space 48 comprises a continuous labyrinth network outside the cells of the outer lattice body. Ambient air may flow into each of the inner secondary space 36 and the outer secondary space 48. The fan 24 may be used to force the air through each of the inner secondary space 36 and the outer secondary space 48. The inner secondary space 36 may extend within the inner lattice body (inside the cells thereof) and inside the casing 16. The outer secondary space 48 may extend within the outer lattice body (outside the cells thereof) and inside the casing 16. How far the inner secondary space 36 and the outer secondary space 48 extend depends on the positioning of the separation walls 32.

In this example, the inner lattice body is composed of the inner primary structure 26 and the inner secondary structure 28, and the outer lattice body is composed of the outer primary structure 42 and the outer secondary structure 44. A coolant volume 38 is delimited between the inner lattice body and the outer lattice body. The coolant volume 38 is thus provided outside the cells of the inner lattice body and inside the cells of the outer lattice body. Also in this example, the coolant volume 38 comprises a continuous labyrinth network. The coolant volume 38 is separated from each of the inner primary space 34, the outer primary space 46, the inner secondary space 36 and the outer secondary space 48. The separation wall 32 is configured to allow coolant of the coolant volume 38 to flow between the primary side 20 and the secondary side 22.

The coolant volume 38 contains two-phase coolant and is provided with a porous capillary structure 40 in the same way as in FIGS. 1-3. The coolant volume 38 thus forms an evaporator region adjacent the inner primary space 34 and the outer primary space 46, and a condenser region adjacent the inner secondary space 36 and the outer secondary space 48.

Due to the intricated lattice bodies in FIGS. 4 and 5, the surface areas exposed for heat transfer between the inner primary space 34 and the coolant volume 38, and between the outer primary space 46 and the coolant volume 38, are very large. Correspondingly, the intricated lattice bodies also provide very large surface areas exposed for heat transfer between the inner secondary space 36 and the coolant volume 38, and between the outer secondary space 48 and the coolant volume 38, through which air is forced by means of the fan 24. The passive cooling is further enhanced by the capillary structure 40. The heat exchanger 12 thereby provides an even more effective heat transfer with a compact design.

Figure 6:
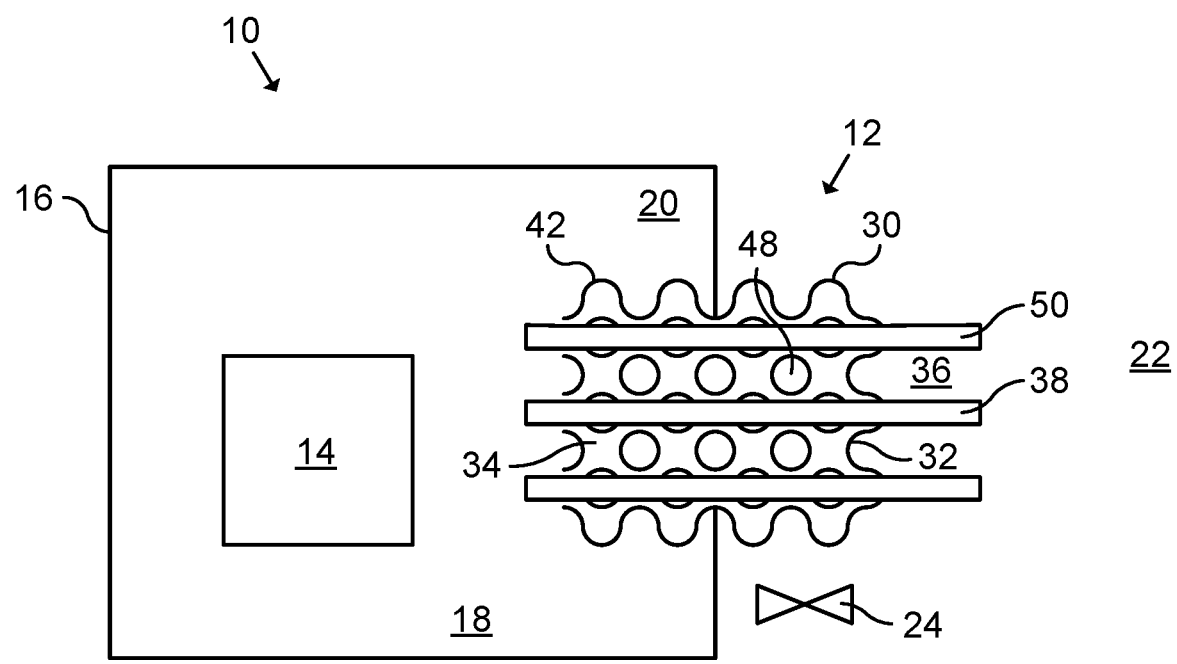
FIG. 6: schematically represents a side view of an electric arrangement comprising a further example of a heat exchanger.
Figure 7:
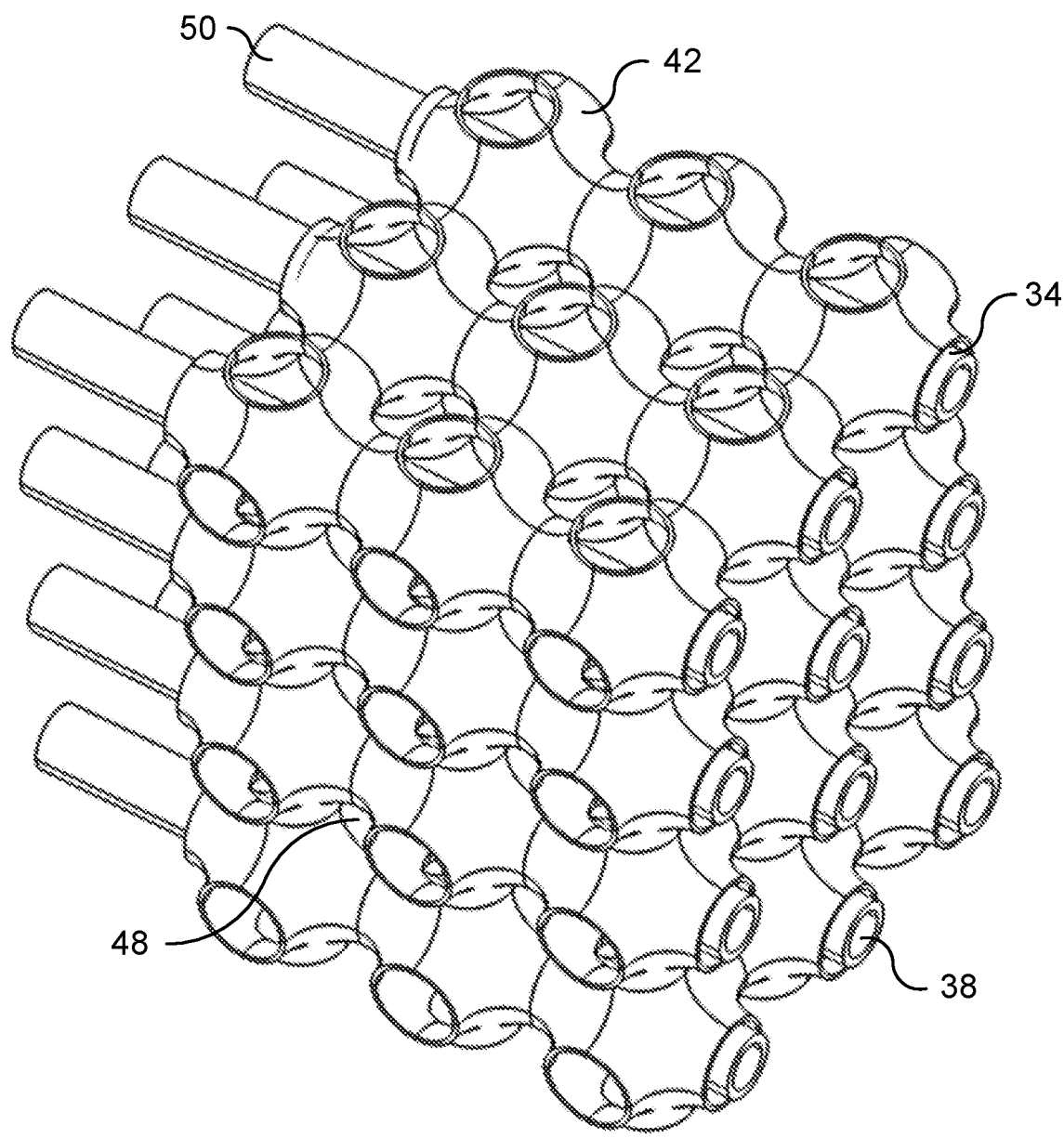
FIG. 7: schematically represents a partial perspective view of the heat exchanger in FIG. 6.

FIG. 6 schematically represents a side view of a power transformer 10 comprising a further example of a heat exchanger 12 and FIG. 7 schematically represents a partial perspective view of the heat exchanger 12 in FIG. 6. With collective reference to FIGS. 6 and 7, mainly differences with respect to FIGS. 1-3 will be described.

The heat exchanger 12 in FIGS. 6 and 7 comprises a plurality of straight heat pipes 50 and an outer primary structure 42. The outer primary structure 42 comprises a three dimensional lattice body, here exemplified as a triply periodic minimal surface, TPMS. The outer primary structure 42 comprises a plurality of cells. Also in this example, the cells of the lattice body are arranged in three orthogonal directions. In this example, the outer primary structure 42 comprises a separation wall 32. The separation wall 32 separates the primary side 20 and the secondary side 22. The separation wall 32 is configured to allow coolant of the coolant volume 38 to flow between the primary side 20 and the secondary side 22.

Each heat pipe 50 is arranged inside the outer primary structure 42. More specifically, each heat pipe 50 extends through the separation wall 32 and through the outer primary structure 42. The heat pipes 50 thus constitute an inner primary structure on the primary side 20 of the separation wall 32 and a secondary structure on the secondary side 22 of the separation wall 32.

The sections of the heat pipes 50 on the primary side 20 of the separation wall 32 (to the left in FIG. 6) and the outer primary structure 42 delimit a primary space 34 therebetween on the primary side 20. The primary space 34 is in fluid communication with the primary side 20. The primary space 34 comprises a continuous labyrinth network inside the cells of the outer primary structure 42. The oil 18 may thus flow from the electric component 14 into the primary space 34 and then back to the electric component 14.

The sections of the heat pipes 50 on the secondary side 22 of the separation wall 32 (to the right in FIG. 6) define a secondary space 36 therebetween. A secondary space 48 is also provided inside the outer primary structure 42, i.e. outside the cells. Each of the secondary spaces 36, 48 is in fluid communication with the secondary side 22. The secondary space 48 comprises a continuous labyrinth network outside the cells of the outer primary structure 42. Ambient air may flow into each of the secondary space 36 between the heat pipes 50 and the secondary space 48 outside the cells of the outer primary structure 42. The fan 24 may be used to force the air through the secondary spaces 36, 48.

Both ends of each heat pipe 50 are closed. Each heat pipe 50 thereby delimits a coolant volume 38 therein. The coolant volume 38 is separated from the primary space 34 and the secondary spaces 36, 48.

The coolant volume 38 contains two-phase coolant and is provided with a porous capillary structure 40 in a corresponding way as in FIGS. 1-3. The capillary structure 40 is provided on interior surfaces of the heat pipes 50. The coolant volume 38 inside the heat pipes 50 thus forms an evaporator region adjacent the outer primary structure 42, and a condenser region adjacent the secondary space 36. How far outside the outer primary structure 42 the heat pipes 50 extend on the secondary side 22 depends on how much heat that needs to be transferred to condensate the coolant by natural convection.

Due to the intricated structures in FIGS. 6 and 7, i.e., the heat pipes 50 inside the lattice body, the surface areas exposed for heat transfer between the primary space 34 and the coolant volume 38, and between the primary space 34 and the secondary space 48, are large. Air is forced through the secondary spaces 36, 48 by means of the fan 24. The passive cooling is further enhanced by the capillary structure 40. The heat exchanger 12 in FIGS. 6 and 7 is also relatively simple since commercially available heat pipes 50 can be inserted into the lattice body. The heat exchanger 12 thereby provides an effective heat transfer with a compact and simple design.

Figure 8:
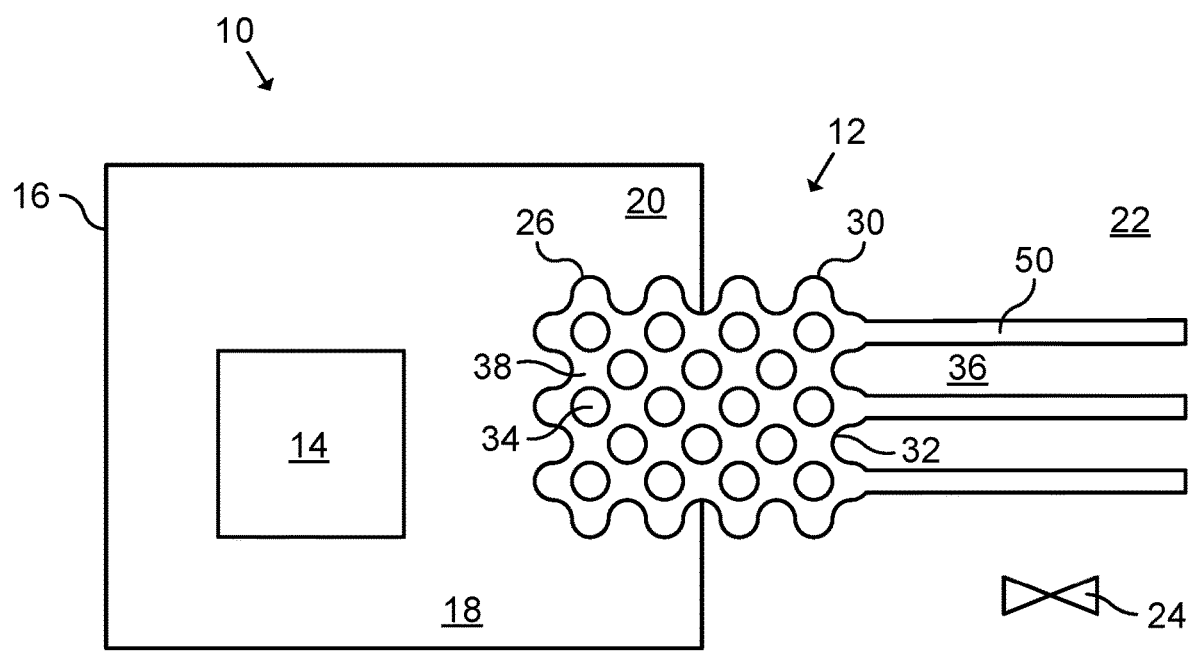
FIG. 8: schematically represents a side view of an electric arrangement comprising a further example of a heat exchanger.

FIG. 8 schematically represents a side view of a power transformer 10 comprising a further example of a heat exchanger 12. Mainly differences with respect to FIGS. 6 and 7 will be described.

The heat exchanger 12 in FIG. 8 comprises a primary structure 26 and a plurality of straight heat pipes 50. The primary structure 26 comprises a three dimensional lattice body, here exemplified as a triply periodic minimal surface, TPMS. The primary structure 26 comprises a plurality of cells. Also in this example, the cells of the lattice body are arranged in three orthogonal directions.

In this example, the primary structure 26 comprises a separation wall 32. The primary structure 26 defines a primary space 34 outside the cells of the primary structure 26. The primary space 34 comprises a continuous labyrinth network outside the cells of the primary structure 26. Oil 18 can flow into the primary space 34. Outside of the casing 16, the primary space 34 is closed to the secondary side 22. Thus, the primary space 34 extends both inside and outside of the casing 16. The separation wall 32 is configured to allow coolant of the coolant volume 38 to flow between the primary side 20 and the secondary side 22.

The heat pipes 50 of this example constitute a secondary structure. As shown in FIG. 8, ends of the heat pipes 50 are connected to cells of the primary structure 26, for example by welding. Thus, the heat pipes 50 transition into the primary structure 26. Each opposite end of the heat pipes 50 is closed. A coolant volume 38 is provided inside the heat pipes 50 and inside the cells of the primary structure 26. As shown in FIG. 8, the coolant volume 38 of this example is continuous.

The heat pipes 50 delimit a secondary space 36 therebetween. The secondary space 36 is thus in fluid communication with the secondary side 22. Ambient air may flow into each of the secondary space 36 between the heat pipes 50.

The fan 24 may be used to force the air through the secondary space 36. As shown in FIG. 8, the fan 24 is positioned further away from the primary structure 26.

The coolant volume 38 is separated from the primary space 34 and the secondary space 36. The coolant volume 38 contains two-phase coolant and is provided with a porous capillary structure 40 in a corresponding way as in FIGS. 1-3. The capillary structure 40 is provided on interior surfaces of the heat pipes 50 and on interior surfaces of the primary structure 26. The coolant volume 38 thus forms an evaporator region in the primary structure 26, and a condenser region in the heat pipes 50.

Also in FIG. 8, the lattice body provides large surface areas exposed for heat transfer between the primary space 34 and the coolant volume 38. The passive cooling is further enhanced by the capillary structure 40. The heat exchanger 12 in FIG. 8 is very simple due to the attachment of the heat pipes 50 to cells of the primary structure 26. The heat exchanger 12 thereby provides an effective heat transfer with a compact and simple design. Moreover, the heat exchanger 12 in FIG. 8 enables the condenser region of the coolant volume 38 to be positioned far away from the casing 16 in a simple manner.

While the present disclosure has been described with reference to exemplary embodiments, it will be appreciated that the present disclosure is not limited to what has been described above. For example, it will be appreciated that the dimensions of the parts may be varied as needed. Accordingly, it is intended that the present disclosure may be limited only by the scope of the claims appended hereto.

The invention claimed is:

1. A heat exchanger comprising:
   a primary side;
   a secondary side;
   at least one primary structure on the primary side defining at least one primary space on the primary side; and
   at least one secondary structure on the secondary side defining at least one secondary space on the secondary side;
   wherein one or more of the at least one primary structure and one or more of the at least one secondary structure delimit a coolant volume separated from the at least one primary space and separated from the at least one secondary space;
   wherein one or more of the at least one primary structure and/or one or more of the at least one secondary structure comprises a three dimensional lattice body; and
   wherein the heat exchanger further comprises a separation structure providing a fluid tight seal between the at least one primary space on the primary side and the at least one secondary space on the secondary side, and wherein the separation structure is configured to allow coolant of the coolant volume to flow between the primary side and the secondary side.

2. The heat exchanger according to claim 1, wherein the heat exchanger comprises two-phase coolant within the coolant volume.

3. The heat exchanger according to claim 1, wherein one or more of the at least one primary structure and/or one or more of the at least one secondary structure is a pipe.

4. The heat exchanger according to claim 1, wherein the lattice body comprises a triply periodic substantially minimal surface.

5. The heat exchanger according to claim 1, wherein one or more of the at least one primary structure delimiting the coolant volume and one or more of the at least one secondary structure delimiting the coolant volume are integrally formed.

6. The heat exchanger according to claim 1, wherein the at least one primary structure comprises two primary structures delimiting the coolant volume therebetween, and/or wherein the at least one secondary structure comprises two secondary structures delimiting the coolant volume therebetween.

7. The heat exchanger according to claim 1, wherein one or more of the at least one primary structure and/or one or more of the at least one secondary structure is additively manufactured.

8. The heat exchanger according to claim 1, wherein the at least one primary structure delimiting the coolant volume, and the at least one secondary structure delimiting the coolant volume comprises a capillary structure facing the coolant volume.

9. The heat exchanger according to claim 1, wherein the coolant volume, the at least one primary structure delimiting the coolant volume, and the at least one secondary structure delimiting the coolant volume are configured to function as a heat pipe.

10. The heat exchanger according to claim 1, wherein one or more of the at least one primary structure and/or one or more of the at least one secondary structure comprises a rough surface having an arithmetic mean surface roughness of at least 10 μm.

11. The heat exchanger according to claim 1, wherein one or more of the at least one primary structure and/or one or more of the at least one secondary structure comprises a customized surface for promoting fluid flow.

12. The heat exchanger according to claim 11, wherein the customized surface comprises a periodic texture.

13. The heat exchanger according to claim 1, wherein the one or more of the at least one primary structure and/or the one or more of the at least one secondary structure that comprises the lattice body also comprises non-flat and flow-promoting ends.

14. An electric arrangement comprising a heat generating electric component and a heat exchanger according to claim 1 arranged to cool the electric component.

15. The electric arrangement according to claim 14, wherein the electric arrangement is a high voltage static electric induction system.

16. The electric arrangement according to claim 14, wherein one or more of the at least one primary structure and/or one or more of the at least one secondary structure comprises a customized surface for promoting fluid flow, and wherein the customized surface comprises a periodic texture.

17. The electric arrangement according to claim 14, wherein the at least one primary structure delimiting the coolant volume, and the at least one secondary structure delimiting the coolant volume comprises a capillary structure facing the coolant volume.

18. The electric arrangement according to claim 14, wherein the heat exchanger comprises two-phase coolant within the coolant volume.

19. The electric arrangement according to claim 14, wherein one or more of the at least one primary structure delimiting the coolant volume and one or more of the at least one secondary structure delimiting the coolant volume are integrally formed.

20. The electric arrangement according to claim 14, wherein the coolant volume, the at least one primary structure delimiting the coolant volume, and the at least one secondary structure delimiting the coolant volume are configured to function as a heat pipe.

\* \* \* \* \*